Aug. 26, 1947.   J. W. WOHLHIETER   2,426,479
CABLE SUPPORTING CLAMP
Filed April 22, 1944
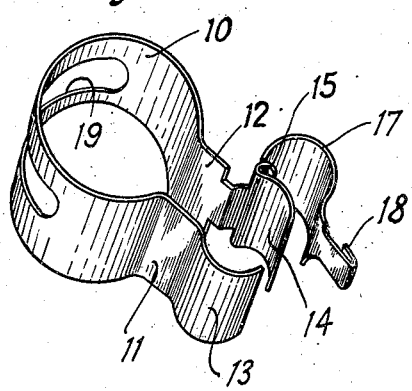
Fig. 1
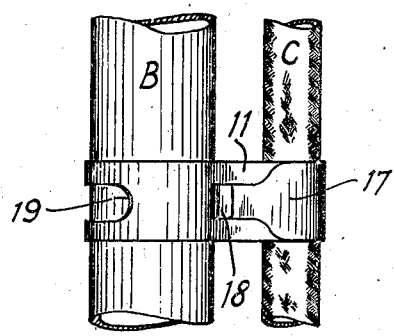
Fig. 2
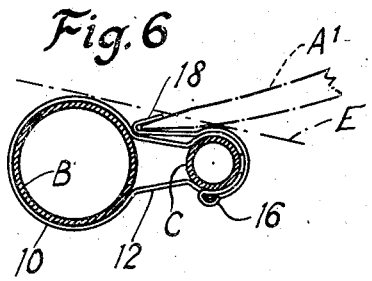
Fig. 6
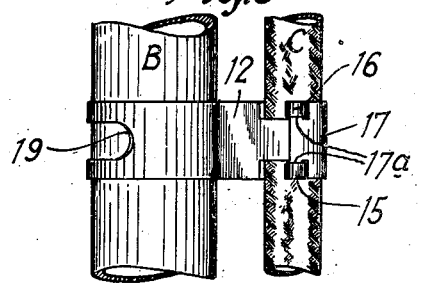
Fig. 3
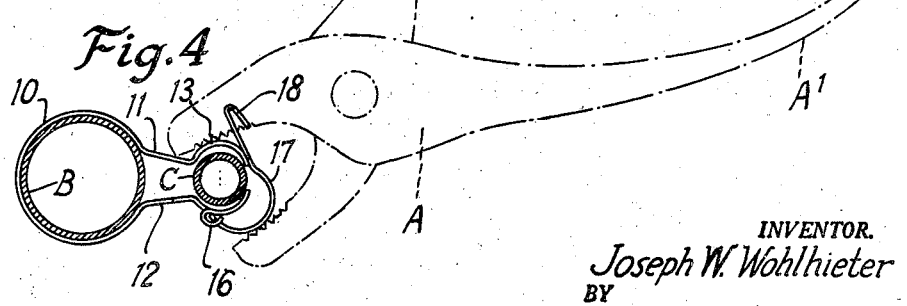
Fig. 5
Fig. 4
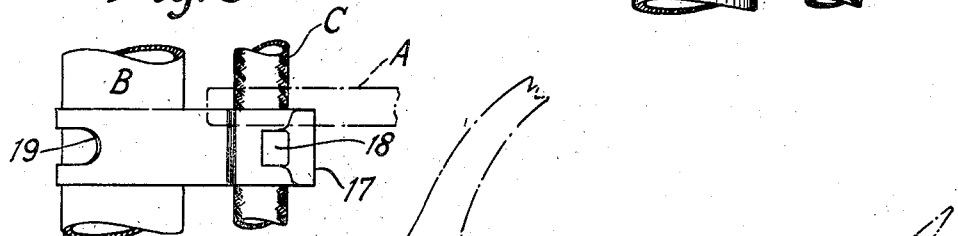
INVENTOR.
Joseph W. Wohlhieter
BY
Ramsey, Kent & Chisholm
ATTORNEYS Patented Aug. 26, 1947

2,426,479

UNITED STATES PATENT OFFICE 2,426,479

CABLE SUPPORTING CLAMP

Joseph W. Wohlhieter, East Orange, N. J., assignor to The Palnut Company, Irvington, N. J., a corporation of New Jersey Application April 22, 1944, Serial No. 532,237

6 Claims. (Cl. 24—81)

My invention relates to improvements in clamps and has to do, more particularly, with the provision of a device for grasping a plurality of objects and securing same in assembly characterized by a definite object-spaced relationship. A device of this nature has a wide field of utility. In order to illustrate the concepts of my invention, I have herein disclosed, as an example thereof, a double clamp for use as an ignition-harness support adapted for installation upon a tubular push rod housing of a conventional radial aircraft engine.

In an assembly of this sort, a number of factors are involved. It is of primary importance that the clamp which is to bridge the push rod housing and the ignition wire harness be absolutely reliable in its security of fastening; it should be of minimum weight; it should be capable of quick and easy installation and disassembly with simple commonplace tools, for a single engine may have as many as thirty-six such clamps in use thereon. It should be of simple, rugged and unitary construction to preclude necessity for replacements due to failure or loss of component parts. Finally, it should be adaptable for use, without special adjustment, to push-rod housings and ignition harness within the range of variations in size and shape experienced and allowed as manufacturing tolerances therein.

It is, accordingly, a salient object of the present invention to provide a clamp for grasping and holding a plurality of objects in a desired spaced relationship, which clamp is secure in its fastening, light in weight, simple, rugged, and unitary in construction, quick and easy to install and remove, reusable when detached, and self-adjustable to objects known to vary somewhat in size and shape.

It is a further object of my invention to provide a clamp construction, of the general character stated, which clamp is capable of manufacture on a production basis at low cost for material, equipment and labor.

It is also an object of my invention to provide a clamp construction for securing a plurality of objects in desired spaced relationship which clamp, though firm in its grasping of such objects, cannot be inadvertently applied in such manner as to impose excessive strains thereupon which might collapse or otherwise damage the objects grasped. Conversely, it is an object of my invention to provide such a clamp structure which may be easily removed without the necessity for imposing severe strains upon either of the objects embraced thereby.

Further objects, and objects relating to details and economies of construction and use will more definitely appear from the detailed description to follow.

My invention is clearly defined in the appended claims. In the claims, as well as in the description, parts are identified by specific names for convenience, but such nomenclature is intended to be as generic, in its application to similar parts, as the prior art will permit. The best form in which I have contemplated applying my invention is illustrated in the accompanying drawings forming a part of this specification in which:

Fig. 1 is a perspective view of a spring clamp, embodying my invention, especially adapted for use in the support of a section of ignition harness from the push-rod housing tube of an aircraft engine;

Fig. 2 is a view, in side elevation, of the same clamp shown in its application to portions of such a push-rod housing tube and ignition harness, the view being drawn to a smaller scale than Fig. 1;

Fig. 3 is a view, in side elevation, of the same parts as shown in Fig. 2, the assembly having been turned end for end to show the opposite side thereof;

Fig. 4 is a bottom plan view showing the structures illustrated in Fig. 2 about to be brought into clamped assembly by a conventional pair of pliers;

Fig. 5 is a view similar to Fig. 2 showing the position of the several parts, including the pliers, at the stage of assembly illustrated in Fig. 4; and Fig. 6 is a plan view similar to Fig. 4 but illustrating the parts in clamped assembly and about to be unclamped by the screw-driver end of the pliers previously employed for assembly purposes.

The same reference characters refer to the same parts throughout the several views of the drawings.

In a broad sense, my invention finds embodiment in a clamp for grasping a plurality of objects comprising a band of spring steel or the like having the general form of a spring tongs such as is commonly employed for the handling of lump sugar. The spring-tongs-like band comprises a bight portion which is of slightly greater than semi-annular extent and which otherwise so conforms to the size and shape of one of the objects as to have snap-engagement therewith. The unstressed size of this bight portion is preferably slightly less than that of the object about which it is disposable with the result that there is an inherent frictional engagement therebetween. From the bight portion extend two arms which terminate in arcuate pads or jaw portions which are adapted to grasp, therebetween, the opposite sides of a second object. For the purpose of effecting such grasping, one of the jaw portions is formed with hinge means which receive one end of a spring bow or clip so shaped and of such size as to close the jaw portions upon the object when the spring bow is sprung or snapped thereabout. Where, as in the illustrated embodiment, the device is required to be extremely secure against loosening or detachment, this spring bow is formed of hardened and tempered spring steel having considerable resistance to flexure. The application of such a steel bow may, in some instances, require more force than can be conveniently applied by the unaided fingers. Accordingly, the bow is desirably so shaped as to facilitate the use of conventional pliers thereon to effect the springing thereof upon the jaw portions of the tongs-like band, and a hook portion is provided as an extension of its unhinged end whereby a simple lever, such as a screw driver or the like, may be employed to facilitate unspringing thereof and loosening of the jaws from their directly-engaged object. To afford greater flexibility in the band element, particularly in instances where the spacing between the objects to be grasped is small and the band arms are correspondingly short, the bight portion of the band is advantageously lightened as by removing a notch-defining section therefrom. Such a lightened construction is also meritorious for the saving in weight thereby afforded, particularly where the device is designed for use in large numbers upon aircraft.

Referring, now, to the accompanying drawing wherein I have shown such a clamp construction especially suited for the support of ignition harness from the push rod housing tubes of a radial-type aircraft engine, the clamp comprises two simple parts permanently associated by integral hinge portions. One part has the general form of a spring tongs such as is commonly employed for the handling of lump sugar. It consists of a band of hardened and tempered spring steel the spring loop or bight portion 10 of which is of generally cylindrical configuration defining less than a complete annulus, from the ends of which spring loop extend arms 11 and 12, one arm 11 of which terminates in an arcuate pad or jaw portion 13, and the other arm 12 of which terminates in an arcuate pad or jaw portion 14. The arm 12 is provided with cut-out tongues which are curled back (prior to hardening and tempering) into the form of loops 15 and 16 (both shown in Fig. 3) and serve as pintle sockets.

A spring bow 17 constitutes the other part of the illustrated clamp. This member 17 is also preferably formed from spring steel first shaped and then hardened and tempered. Notches are provided adjacent one end of the member 17 and define thereat a pintle 17a which is received within the sockets 15, 16 before the tongs-like member is hardened and tempered. The other end of the spring bow 17, remote from the pintle 17a thereof, is extended in the form of a relatively narrow hook 18 the purpose of which will be described in conjunction with the mode of use for the device. The spring bight 10 of the clamp illustrated is cut out at 19 for purposes also later to be described.

The illustrated clamp is applied to the push rod housing B simply by snapping the bight portion 10 onto the housing B with the arms 11, 12 directed toward the section C of the ignition harness. The unstressed size of the bight 10 is slightly less than the external size of the housing B and the arms 11 and 12 are so directed that, as thus far installed, the pads or jaws 13, 14 thereon are normally slightly spaced from contact with opposite sides of the harness section C, as depicted in Fig. 4. By reason of the reduced width and centralized location of the hook portion 18, as shown in Figs. 2 and 5, the jaws of a conventional pair of pliers A may be readily applied to the clamp portions as illustrated in Fig. 4 and the spring bow 17 may be easily sprung, snap-fashion, around the pads 13, 14, slightly flexing the arms 11, 12 and bringing the pads into firm grasping relation with the harness section C as shown in Figs. 2 and 6. Ignition harness for aircraft engines is usually in the form of a braided metallic tubing within which insulated high-tension electrical conductors extend. Such braided tubing is not, ordinarily, highly resistant to collapse, hence the spring bow 17 is designed to apply firm but not excessive constrictive force upon the pads 13, 14. When the spring bow 17 is sprung upon the pads 13, 14, a certain degree of constrictive effect is also applied to the bight portion 10 of the clamp through the arms 11, 12 thereof, insuring a secure frictional engagement of the bight portion 10 with the therewithin disposed housing B. To increase the security of this frictional engagement, the bight portion 10 is preferably lightened by removal of metal to form the notched out portion 19, which affords an increase in the conformability of the bight portion to the housing.

Radial engines of as many as eighteen cylinders are commonly employed in aircraft. Each cylinder is, as a rule, supplied with dual ignition, with the result that as many as thirty-six such clamps may be employed upon a single motor; one hundred and forty-four on a single four-motor plane. It is of great importance, then, that such clamps be easily removable for minor overhaul or harness replacement. The illustrated clamp may be removed by the simple expedient of inserting the bit of a screw-driver (or the screw-driver handle A' of the illustrated pliers) within the hook 18 and levering the spring bow 17 around to open position on its hinge part 17a as depicted in Fig. 6. Thus pried open, the clamp assumes its original form shown in Fig. 1 and may be readily snapped off the tube B upon which it was mounted. The clamp is light and it may be installed or removed in a moment of time by tools common to any kit. The illustrated clamp, though composed of two parts, is not inadvertently separable under normal conditions of use and abuse, so that parts thereof never become misplaced. The clamp is secure in its attachment even to housings and harness which vary individually or collectively in size and shape as much as ten or twelve thousandths of an inch—the departures in size permitted and experienced in these structures. The spring bow is engaged, in and during assembly, solely with the pads 13 and 14 and is never directly applied to the surfaces of objects clamped. Similarly, the prying open of the spring bow does not require imposition of injurious forces to the clamped objects. The hook 18 securely receives the bit of the opening lever with the result that no tendency toward slipping of the lever need be guarded against and chance of injury to the harness C or other motor elements from this cause is eliminated. The hook 18 of the installed clamp lies (note the dotted line in Fig. 8) within a plane tangent to the curved extremities of the clamp with the result that inadvertent snagging thereof or of any other portion of the clamp by the fingers or apparel of a mechanic is almost impossible. The clamp is compact, offering an utter minimum of interference with access to other structures of the engine. Finally, the cost of producing such a clamp on a large scale is extremely low, due to the simplicity of its construction, the cheapness of the flat stock from which it is fabricated, and the elemental character of the dies and equipment by which it may be formed.

Clamps embodying the basic features of my invention may be advantageously employed for numerous purposes with or without minor changes in form, size and material. I therefore regard the herein illustrated clamp as merely one example of its concepts and I, accordingly, intentionally claim my invention broadly, as indicated by the appended claims.

What I claim is:

1. A clamp for grasping a plurality of objects and firmly maintaining same in a definite spaced positional relationship, comprising: a band having a bight portion for partially encircling and snugly clasping one of said objects and provided with collaterally-extending spaced arm portions formed adjacent their free ends for conformitively snugly clasping therebetween a second object disposed in definite spaced relation to the first object, and a generally U-shaped spring bow having one leg of its U-formation hinged to one of said arm portions externally of its conformitive object-clasping surface, the concave side of the U-formation of the bow facing toward the free ends of said spaced arm portions, and the bow being swingable on its hinge axis into bridging relation across the free ends of said spaced arm portions and tightly snap-sprung clamping association around said spaced arm portions.

2. A unitary two-piece clamp for grasping a plurality of rod-like objects and firmly maintaining same in a definite spaced positional relationship, comprising: a flexible one-piece spring band having a lightened bight portion for partially encircling and snugly clasping one of said objects and provided with collaterally-extending spaced arm portions formed adjacent their free ends for conformitively snugly clasping therebetween a second object disposed in definite spaced relation to the first object, and a generally U-shaped spring bow having one leg of its U-formation hinged to one of said arm portions externally of its conformitive object-clasping surface, the concave side of the U-formation of the bow facing toward the free ends of said spaced arm portions, and the bow being swingable on its hinge axis into bridging relation across the free ends of said spaced arm portions and tightly snap-sprung clamping association around said spaced arm portions.

3. A clamp for grasping a plurality of objects and firmly maintaining same in a definite spaced positional relationship, comprising: a band part having a bight portion for partially encircling and snugly clasping one of said objects and provided with collaterally-extending spaced arm portions formed adjacent their free ends for conformitively snugly clasping therebetween a second object disposed in definite spaced relation to the first object, and a generally U-shaped spring bow part having the end of one leg of its U-formation integrally hinged to one of said arm portions externally of its conformitive object-clasping surface, the concave side of the U-formation of the bow part facing toward the free ends of said spaced arm portions, and the bow part being swingable on its hinge axis into bridging relation across the free ends of said spaced arm portions and tightly snap-sprung clamping association around said arm portions, said spring bow part having a screw-driver-engageable tongue portion at the end of the other leg of its U-formation and disposed, in the clamping position of said bow part, adjacent the bight-portion-attached end of the other of said arm portions whereby said spring bow may be easily manually levered out upon itself from tightly snap-sprung clamping association with said spaced arm portions.

4. A clamp for grasping a plurality of objects and firmly maintaining same in a definite spaced relationship, comprising: a one-piece tempered spring steel band having a bight portion for partially encircling and snugly clasping one of said objects and provided with collaterally-extending spaced arm portions formed adjacent their free ends for conformitively snugly clasping therebetween a second object disposed in definite spaced relation to the first object, and a generally U-shaped stiff tempered spring steel bow having one end of its U-formation permanently hinged to one of said arm portions externally of its conformitive object-clasping surface, the hinge structure comprising a pair of integral pintle sockets composed of the metal of side edge portions of said one of said arm portions and which extend into notches in both side edges of said spring steel bow and located adjacent to one end thereof, the concave side of the U-formation of the bow facing toward the free ends of said spaced arm portions, and the bow being swingable on its hinge axis into bridging relation across the free ends of said spaced arm portions and tightly snap-sprung clamping association around said spaced arm portions.

5. A clamp for grasping a plurality of objects and firmly maintaining same in a definite spaced relationship, comprising: a generally U-shaped one-piece tempered spring steel band having a more than semiannular bight portion for snugly clasping one of said objects and provided with collaterally-extending spaced arm portions formed adjacent their respective free ends into arcuate jaw portions for conformitively snugly clasping therebetween a second object disposed in definite spaced relation to the first object, and a stiff, more than semiannular tempered spring steel bow permanently hinged to one of said spaced arm portions externally of its conformitive object-clasping surface, swingable on its hinge axis and snap-sprung-applicable around said arcuate object-clasping jaw portions by means of pressure from conventional pliers manually applied across the intermediate portion of said bow and the arcuate jaw portion of the other of said arms.

6. A clamp for grasping a plurality of objects and firmly maintaining same in a definite spaced relationship, comprising: a generally U-shaped one-piece tempered spring steel band having a more than semiannular bight portion for snugly clasping one of said objects and provided with collaterally-extending spaced arm portions formed adjacent their respective free ends into arcuate jaw portions for conformitively snugly clasping therebetween a second object disposed in definite spaced relation to the first object, and a stiff, more than semiannular tempered spring steel bow permanently hinged to one of said spaced arm portions externally of its conformitive object-clasping surface, swingable on its hinge axis and snap-sprung applicable around said arcuate object-clasping jaw portions by means of pressure from conventional pliers manually applied across the intermediate portion of said bow and the arcuate jaw portion of the other of said spaced arm portions, said spring steel bow having its hinge-remote extremity provided with a relatively narrow hook-ended tongue-like extension by which camming of the arcuate jaw portion of said other of said spaced arm portions into the stiff spring bow is effected during its application, which lies against said other of said spaced arm portions inward of a plane commonly tangent to the adjacent object-surrounding parts of the assembled clamp, and which enables facile levering off of the stiff spring bow by means of a conventional screw driver blade-engaged with the hook end.

JOSEPH W. WOHLHIETER.

REFERENCES CITED

The following references are of record in the file of this patent:

UNITED STATES PATENTS

| Number | Name | Date |
|---|---|---|
| 692,529 | Knittle | Feb. 4, 1902 |
| 1,478,896 | Ferency | Dec. 25, 1923 |
| 1,083,385 | Burgess | Jan. 6, 1914 |
| 1,164,613 | Jewell | Dec. 14, 1915 |
| 759,787 | Wey | May 10, 1904 |
| 1,104,352 | Erlandsson | July 21, 1914 |
| 1,816,301 | Sundell | July 28, 1931 |
| 842,215 | Mansson | Jan. 29, 1907 |
| 771,378 | Luther | Oct. 4, 1904 |